United States Patent
Kwon et al.

(10) Patent No.: US 10,024,399 B2
(45) Date of Patent: Jul. 17, 2018

(54) PLANETARY GEAR TRAIN OF AUTOMATIC TRANSMISSION FOR VEHICLE

(71) Applicant: Hyundai Motor Company, Seoul (KR)

(72) Inventors: Hyun Sik Kwon, Seoul (KR); Seong Wook Hwang, Gunpo-si (KR); Ki Tae Kim, Incheon (KR); Wonmin Cho, Hwaseong-si (KR); Jae Chang Kook, Hwaseong-si (KR); Seongwook Ji, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/365,593

(22) Filed: Nov. 30, 2016

(65) Prior Publication Data

US 2018/0073602 A1 Mar. 15, 2018

(30) Foreign Application Priority Data

Sep. 12, 2016 (KR) .................. 10-2016-0117352

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01); *F16H 2200/2097* (2013.01)

(58) Field of Classification Search
CPC ............... F16H 3/66; F16H 2200/2097; F16H 2200/2046; F16H 2200/0069; F16H 2200/2012

USPC .................. 475/275–291, 311, 330
See application file for complete search history.

(56) References Cited

U.S. PATENT DOCUMENTS

| 6,743,140 | B1 * | 6/2004 | Lee | F16H 3/666 475/275 |
| 7,993,235 | B2 | 8/2011 | Wittkopp et al. | |
| 8,025,602 | B2 | 9/2011 | Phillips et al. | |
| 2004/0110595 | A1 * | 6/2004 | Lee | F16H 3/666 475/280 |
| 2016/0356357 | A1 * | 12/2016 | Kook | F16H 3/66 |
| 2016/0363190 | A1 * | 12/2016 | Kook | F16H 3/66 |
| 2017/0159762 | A1 * | 6/2017 | Kook | F16H 3/66 |
| 2017/0268620 | A1 * | 9/2017 | Ji | F16H 3/66 |

FOREIGN PATENT DOCUMENTS

| DE | 102009028700 A1 * | 2/2011 | ............... F16H 3/66 |
| JP | 2014-105849 A | 6/2014 | |
| KR | 10-2016-0070427 A | 6/2016 | |

* cited by examiner

*Primary Examiner* — Roger L Pang
(74) *Attorney, Agent, or Firm* — Morgan, Lewis & Bockius LLP

(57) ABSTRACT

A planetary gear train of an automatic transmission for a vehicle is disclosed. The planetary gear train may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; and a fourth planetary gear set including tenth, eleventh, and twelfth rotation elements.

10 Claims, 2 Drawing Sheets

FIG. 2

| speed stages | control element | | | | | | gear ratio |
|---|---|---|---|---|---|---|---|
| | C1 | C2 | C3 | C4 | C5 | B1 | |
| D1 | | | ● | ● | | ● | 5.405 |
| D2 | ● | | ● | | | ● | 3.200 |
| D3 | ● | | | | ● | ● | 2.311 |
| D4 | ● | | | ● | | ● | 1.625 |
| D5 | ● | | | ● | ● | | 1.180 |
| D6 | ● | ● | | ● | | | 1.000 |
| D7 | ● | ● | | | ● | | 0.893 |
| D8 | | ● | | ● | ● | | 0.813 |
| D9 | | | ● | | ● | | 0.722 |
| D10 | | | ● | ● | ● | | 0.565 |
| REV | | ● | | ● | | ● | -2.275 |

PLANETARY GEAR TRAIN OF AUTOMATIC TRANSMISSION FOR VEHICLE

CROSS-REFERENCE TO RELATED APPLICATION

The present application claims priority to and the benefit of Korean Patent Application No. 10-2016-0117352 filed on Sep. 12, 2016, the entire contents of which are incorporated herein by reference.

BACKGROUND OF THE INVENTION

Field of the Invention

The present invention relates to an automatic transmission for a vehicle. More particularly, the present invention relates to a planetary gear train of an automatic transmission for a vehicle that improves power delivery performance and fuel economy by achieving ten forward speed stages with a minimum number of constituent elements being used and improves silent driving of the vehicle by using operation point positioned at a low engine speed.

Description of Related Art

Generally, an automatic transmission achieving more speed stages has been developed to enhancing fuel economy and optimizing drivability. Recently, increase of oil price is triggering a hard competition in enhancing fuel consumption of a vehicle.

Therefore, many researches for reducing weight and enhancing fuel economy through downsizing of an engine and for securing drivability and fuel economy through multiple speed stages of automatic transmissions have been developed.

However, in the automatic transmission, as the number of speed stages increase, the number of internal components (particularly, planetary gear sets) increase, and as a result, a length of the transmission increases. Therefore, mountability, cost, weight, transmission efficiency, and the like may still deteriorate.

Accordingly, development of a planetary gear train which may achieve maximum efficiency with a small number of components may be important in order to increase a fuel economy enhancement effect through the multiple-speeds.

In this aspect, in recent years, 8-speed automatic transmissions tend to be implemented and the research and development of a planetary gear train capable of implementing more speed stages has also been actively conducted.

However, a conventional 8-speed automatic transmission typically includes three to four planetary gear sets and five to seven control elements (frictional elements). In this case, since the length of the automatic transmission increases, mountability may be deteriorated.

Recently, one planetary gear set is disposed above another planetary gear set, but structures of automatic transmissions to which parallel planetary gear sets is applied are very limited.

In another way, dog clutches instead of control elements of wet-type are used. However, shift feel can be deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power delivery performance and fuel economy by achieving at least ten forward speed stages and one reverse speed stage.

Another exemplary embodiment of Various aspects of the present invention are directed to providing a planetary gear train of an automatic transmission for a vehicle having further advantages of improving silent driving of the vehicle by using operation point positioned at a low rotational speed region of an engine.

A planetary gear train of an automatic transmission for a vehicle according to an exemplary embodiment of the present invention may include: an input shaft receiving torque of an engine; an output shaft outputting torque; a first planetary gear set including a first rotation element, a second rotation element, and a third rotation element; a second planetary gear set including a fourth rotation element, a fifth rotation element, and a sixth rotation element; a third planetary gear set including a seventh rotation element, an eighth rotation element, and a ninth rotation element; a fourth planetary gear set including tenth, eleventh, and twelfth rotation elements; a first shaft connected to the first rotation element and the fifth rotation element and connected to an input shaft; a second shaft connected to the second rotation element; a third shaft connected to the third rotation element and selectively connectable to the second shaft; a fourth shaft connected to the fourth rotation element and connected to a transmission housing; a fifth shaft connected to the sixth rotation element; a sixth shaft connected to the seventh rotation element and the twelfth rotation element and selectively connectable to the second shaft; a seventh shaft connected to the eighth rotation element and the eleventh rotation element and connected to the output shaft; an eighth shaft connected to the ninth rotation element and selectively connectable to the third shaft; and a ninth shaft connected to the tenth rotation element and selectively connectable to the second shaft or the fifth shaft.

The sixth shaft may be selectively connectable to the transmission housing.

The first, second, and third rotation elements of the first planetary gear set may be a first sun gear, a first planet carrier, and a first ring gear, the fourth, fifth, and sixth rotation elements of the second planetary gear set may be a second sun gear, a second planet carrier, and a second ring gear, the seventh, eighth, and ninth rotation elements of the third planetary gear set may be a third sun gear, a third planet carrier, and a third ring gear, and the tenth, eleventh, and twelfth rotation elements of the fourth planetary gear set may be a fourth sun gear, a fourth planet carrier, and a fourth ring gear, respectively.

The first, the second, the third, and the fourth planetary gear sets may be positioned in a sequence of the third, the first, the second, and the fourth planetary gear sets from the engine.

The planetary gear train may further include: a first clutch selectively connecting the second shaft to the third shaft; a second clutch selectively connecting the second shaft to the sixth shaft; a third clutch selectively connecting the second shaft to the ninth shaft; a fourth clutch selectively connecting the third shaft to the eighth shaft; a fifth clutch selectively connecting the fifth shaft to the ninth shaft; and a first brake selectively connecting the sixth shaft to the transmission housing.

A planetary gear train of an automatic transmission for a vehicle according to another exemplary embodiment of the present invention may include: an input shaft receiving torque of an engine; an output shaft outputting torque; a first planetary gear set including a first rotation element, a second rotation element, and a third rotation element; a second planetary gear set including a fourth rotation element, a fifth rotation element, and a sixth rotation element; a third planetary gear set including a seventh rotation element, an eighth rotation element, and a ninth rotation element; and a fourth planetary gear set including a tenth rotation element, an eleventh rotation element, and a twelfth rotation element, wherein the input shaft is connected to the fifth rotation element, the output shaft is connected to the eleventh rotation element, the first rotation element is connected to the fifth rotation element, the seventh rotation element is connected to the twelfth rotation element, the eighth rotation element is connected to the eleventh rotation element, the second rotation element is selectively connectable to the third, the seventh, and the tenth rotation elements, the third rotation element is selectively connectable to the ninth rotation element, and the sixth rotation element is selectively connectable to the tenth rotation element.

The seventh rotation element may be selectively connectable to a transmission housing.

first rotation element, the second rotation element, and the third rotation element of the first planetary gear set may be a first sun gear, a first planet carrier, and a first ring gear, the fifth rotation element, and the sixth rotation element of the second planetary gear set may be a second sun gear, a second planet carrier, and a second ring gear, the seventh rotation element, the eighth rotation element, and the ninth rotation element of the third planetary gear set may be a third sun gear, a third planet carrier, and a third ring gear, and a tenth rotation element, an eleventh rotation element, and a twelfth rotation element of the fourth planetary gear set may be a fourth sun gear, a fourth planet carrier, and a fourth ring gear, respectively.

The first, the second, the third, and the fourth planetary gear sets may be positioned in a sequence of the third, the first, the second, and the fourth planetary gear sets from the engine.

The planetary gear train may further include: a first clutch selectively connecting the second rotation element to the third rotation element; a second clutch selectively connecting the second rotation element to the seventh rotation element; a third clutch selectively connecting the second rotation element to the tenth rotation element; a fourth clutch selectively connecting the third rotation element to the ninth rotation element; a fifth clutch selectively connecting the sixth rotation element to the tenth rotation element; and a first brake selectively connecting the seventh rotation element to a transmission housing.

The planetary gear train according to the exemplary embodiment of the present invention may achieve ten forward speeds and one reverse speed by combining four planetary gear sets being simple planetary gear sets with six control elements.

In addition, the planetary gear train according to the exemplary embodiment of the present invention may achieve speed stages suitable to a rotational speed of the engine due to multiple-speed stages of the automatic transmission. Particularly, silent driving of the vehicle may be improved by using operation point positioned at a low rotational speed region of an engine.

In addition, the planetary gear train according to the exemplary embodiment of the present invention may maximize driving efficiency of the engine and may improve power delivery performance and fuel consumption.

Other effects obtainable or predictable from the exemplary embodiments of the present invention will be explicitly or implicitly described in a DETAILED DESCRIPTION section. That is, various effects predictable from the exemplary embodiments of the present invention will be described in the DETAILED DESCRIPTION section.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of control elements at each speed stage in the planetary gear train according to an exemplary embodiment of the present invention.

Figure 1:
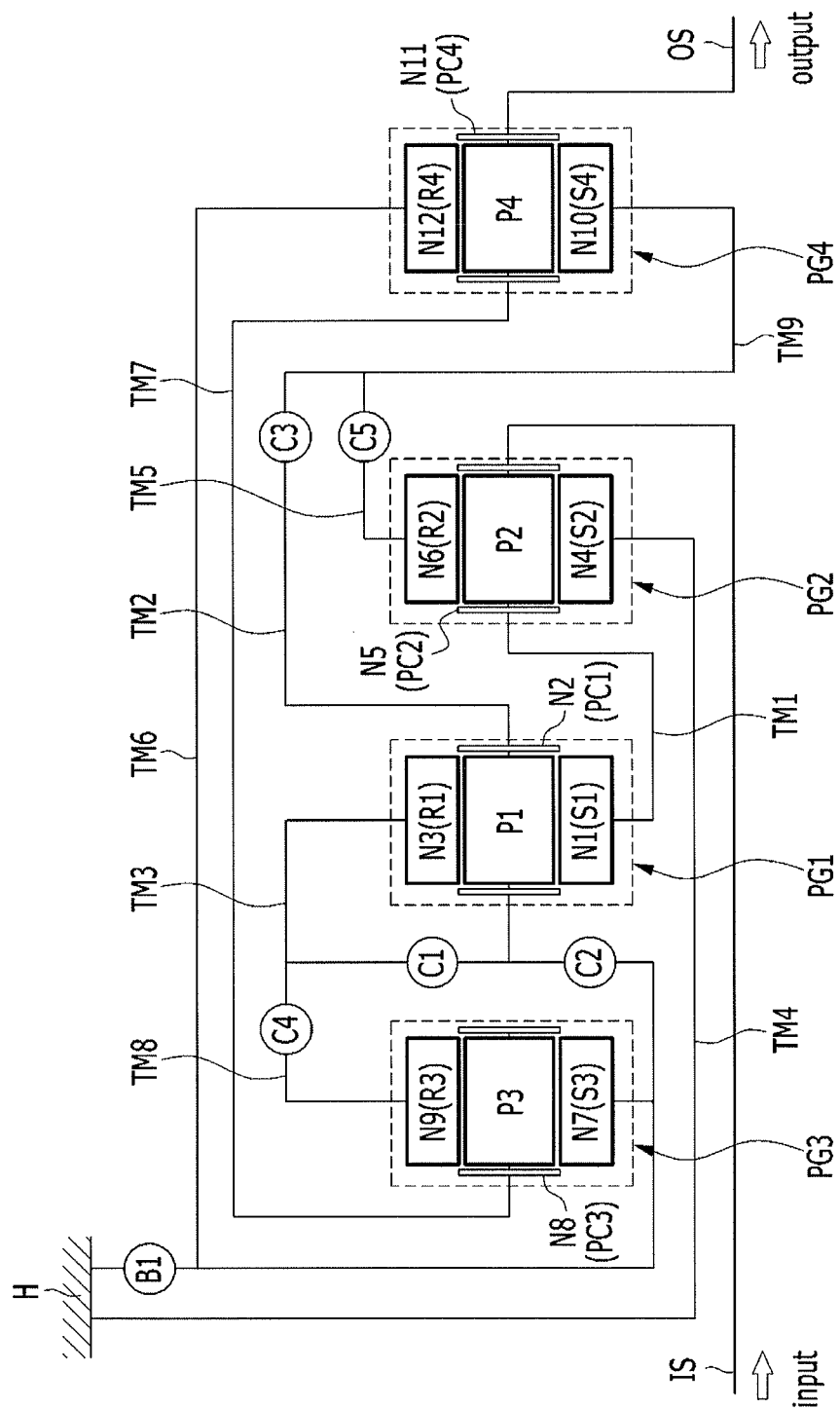
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, parts which are not related with the description are omitted for clearly describing the exemplary embodiments of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG. 1, a planetary gear train according to the exemplary embodiment of the present invention includes first, second, third, and fourth planetary gear sets PG1, PG2, PG3, and PG4 positioned on a same axis, an input shaft IS, an output shaft OS, nine shafts TM1 to TM9 connected to at least one of rotation elements of the first, second, third, and fourth planetary gear sets PG1, PG2, PG3, and PG4, five clutches C1 to C5 and one brake B1 that are control elements, and a transmission housing H.

Torque input from the input shaft IS is changed by cooperation of the first, second, third, and fourth planetary gear sets PG1, PG2, PG3, and PG4 and the changed torque is output through the output shaft OS.

The planetary gear sets are positioned in the order of the third, the first, the second, and the fourth planetary gear sets PG3, PG1, PG2, and PG4 from an engine side.

The input shaft IS is an input member and the torque from a crankshaft of an engine, after being torque-converted through a torque converter, is input into the input shaft IS.

The output shaft OS is an output element, is positioned in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 respectively as tenth, eleventh, and twelfth rotation elements N10, N11, and N12.

The first rotation element N1 is directly connected to the fifth rotation element N5, the seventh rotation element N7 is directly connected to the twelfth rotation element N12, and the eighth rotation element N8 is directly connected to the eleventh rotation element N11 such that the first, the second, the third, and the fourth planetary gear sets PG1, PG2, PG3, and PG4 include nine shafts TM1 to TM9.

The nine shafts TM1 to TM9 will be described in further detail.

The nine shafts TM1 to TM9 may be rotation members that directly connect a plurality of rotation elements among the rotation elements of the planetary gear sets PG1, PG2, PG3, and PG4 with each other or that are directly connected to any one rotation element of the planetary gear sets PG1, PG2, PG3, and PG4 and rotate with the any one rotation element to transmit torque, or may be fixed members that selectively or directly connect any one rotation element of the planetary gear sets PG1, PG2, PG3, and PG4 to the transmission housing H to fix the any one rotation element.

The first shaft TM1 is connected to the first rotation element N1 (the first sun gear S1) and the fifth rotation element N5 (the second planet carrier PC2), and is directly connected to an input shaft IS.

The second shaft TM2 is connected to the second rotation element N2 (the first planet carrier PC1).

The third shaft TM3 is connected to the third rotation element N3 (the first ring gear R1) and is selectively connectable to the second shaft TM2.

The fourth shaft TM4 is connected to the fourth rotation element N4 (the second sun gear S2) and is selectively connectable to a transmission housing H to be continuously operated as a fixed element.

The fifth shaft TM5 is connected to the sixth rotation element N6 (the second ring gear R2).

The sixth shaft TM6 is connected to the seventh rotation element N7 (the third sun gear S3) and the twelfth rotation element N12 (the fourth ring gear R4), is selectively connectable to the second shaft TM2, and is selectively connectable to the transmission housing H to be operated as a selective fixed element.

The seventh shaft TM7 is connected to the eighth rotation element N8 (the third planet carrier PC3) and the eleventh rotation element N11 (the fourth planet carrier PC4), and is directly connected to the output shaft OS.

The eighth shaft TM8 is connected to the ninth rotation element N9 (the third ring gear R3) and is selectively connectable to the third shaft TM3.

The ninth shaft TM9 is connected to the tenth rotation element N10 (the fourth sun gear S4) and is selectively connectable to each of the second shaft TM2 and the fifth shaft TM5.

In addition, five clutches C1, C2, C3, C4, and C5 are positioned at portions at which any two shafts among the nine shafts TM1 to TM9 including the input shaft IS and the output shaft OS are selectively connectable to each other.

In addition, one brake B1 is positioned at a portion at which any one shaft among the nine shafts TM1 to TM9 is selectively connectable to the transmission housing H.

Arrangements of the five clutches C1 to C5 and the one brake B1 are described in detail.

The first clutch C1 is positioned between the second shaft TM2 and the third shaft TM3 and selectively connects the second shaft TM2 to the third shaft TM3.

The second clutch C2 is positioned between the second shaft TM2 and the sixth shaft TM6 and selectively connects the second shaft TM2 to the sixth shaft TM6.

The third clutch C3 is positioned between the second shaft TM2 and the ninth shaft TM9 and selectively connects the second shaft TM2 to the ninth shaft TM9.

The fourth clutch C4 is positioned between the third shaft TM3 and the eighth shaft TM8 and selectively connects the third shaft TM3 to the eighth shaft TM8.

The fifth clutch C5 is positioned between the fifth shaft TM5 and the ninth shaft TM9 and selectively connects the fifth shaft TM5 to the ninth shaft TM9.

The first brake B1 is positioned between the sixth shaft TM6 and the transmission housing H and selectively connects the sixth shaft TM6 to the transmission housing H.

The control elements including the first, the second, the third, the fourth, and the fifth clutches C1, C2, C3, C4, and C5 and the first brake B1 may be frictionally engaging units that are operated by hydraulic pressure. The control elements may be, but not limited to, multi-plates friction elements of wet type. However, the control elements may be engaging units that are operated by electrical signal, including dog clutches, electric clutches, magnetic particle clutches, etc.

FIG. 2 is an operation chart of control elements at each speed stage in the planetary gear train according to an exemplary embodiment of the present invention.

As shown in FIG. 2, three control elements among the first, the second, the third, the fourth, and the fifth clutches C1, C2, C3, C4, and C5 and the first brake B1 that are control elements are operated at each speed stage in the planetary gear train according to the exemplary embodiment of the present invention.

The third and the fourth clutches C3 and C4 and the first brake B1 are simultaneously operated at a first forward speed D1.

In a state that the second shaft TM2 is connected to the ninth shaft TM9 by operation of the third clutch C3 and the third shaft TM3 is connected to the eighth shaft TM8 by operation of the fourth clutch C4, torque of the input shaft IS is input to the first shaft TM1.

In a state that the fourth shaft TM4 is continuously operated as the fixed element, the sixth shaft TM6 is operated as the fixed element by operation of the first brake B1. Therefore, the torque of the input shaft IS is shifted into the first forward speed, and the first forward speed is output through the output shaft OS connected to the seventh shaft TM7.

The first and the third clutches C1 and C3 and the first brake B1 are simultaneously operated at a second forward speed D2.

In a state that the second shaft TM2 is connected to the third shaft TM3 by operation of the first clutch C1 and the second shaft TM2 is connected to the ninth shaft TM9 by operation of the third clutch C3, the torque of the input shaft IS is input to the first shaft TM1.

In a state that the fourth shaft TM4 is continuously operated as the fixed element, the sixth shaft TM6 is operated as the fixed element by operation of the first brake B1. Therefore, the torque of the input shaft IS is shifted into the second forward speed, and the second forward speed is output through the output shaft OS connected to the seventh shaft TM7.

The first and the fifth clutches C1 and C5 and the first brake B1 are simultaneously operated at a third forward speed D3.

In a state that the second shaft TM2 is connected to the third shaft TM3 by operation of the first clutch C1 and the fifth shaft TM5 is connected to the ninth shaft TM9 by operation of the fifth clutch C5, the torque of the input shaft IS is input to the first shaft TM1.

In a state that the fourth shaft TM4 is continuously operated as the fixed element, the sixth shaft TM6 is operated as the fixed element by operation of the first brake B1. Therefore, the torque of the input shaft IS is shifted into the third forward speed, and the third forward speed is output through the output shaft OS connected to the seventh shaft TM7.

The first and the fourth clutches C1 and C4 and the first brake B1 are simultaneously operated at a fourth forward speed D4.

In a state that the second shaft TM2 is connected to the third shaft TM3 by operation of the first clutch C1 and the third shaft TM3 is connected to the eighth shaft TM8 by operation of the fourth clutch C4, the torque of the input shaft IS is input to the first shaft TM1.

In a state that the fourth shaft TM4 is continuously operated as the fixed element, the sixth shaft TM6 is operated as the fixed element by operation of the first brake B1. Therefore, the torque of the input shaft IS is shifted into the fourth forward speed, and the fourth forward speed is output through the output shaft OS connected to the seventh shaft TM7.

The first, the fourth, and the fifth clutches C1, C4, and C5 are operated at a fifth forward speed D5.

In a state that the second shaft TM2 is connected to the third shaft TM3 by operation of the first clutch C1, the third shaft TM3 is connected to the eighth shaft TM8 by operation of the fourth clutch C4, the fifth shaft TM5 is connected to the ninth shaft TM9 by operation of the fifth clutch C5, the torque of the input shaft IS is input to the first shaft TM1.

In addition, the fourth shaft TM4 is continuously operated as the fixed element. Therefore, the torque of the input shaft IS is shifted into the fifth forward speed, and the fifth forward speed is output through the output shaft OS connected to the seventh shaft TM7.

The first, the second, and the fourth clutches C1, C2, and C4 are simultaneously operated at a sixth forward speed D6.

In a state that the second shaft TM2 is connected to the third shaft TM3 by operation of the first clutch C1, the second shaft TM2 is connected to the sixth shaft TM6 by operation of the second clutch C2, and the third shaft TM3 is connected to the eighth shaft TM8 by operation of the fourth clutch C4, the torque of the input shaft IS is input to the first shaft TM1. In this case, the first, the third, and the fourth planetary gear sets PG1, PG3, and PG4 become lock-up states.

Therefore, the torque of the input shaft IS input to the first shaft TM1 is shifted into the sixth forward speed, and the sixth forward speed is output through the output shaft OS connected to the seventh shaft TM7. At the sixth forward speed, rotation speed which is a same as rotation speed of the input shaft IS is output.

The first, the second, and the fifth clutches C1, C2, and C5 are simultaneously operated at a seventh forward speed stage D7.

In a state that the second shaft TM2 is connected to the third shaft TM3 by operation of the first clutch C1, the second shaft TM2 is connected to the sixth shaft TM6 by operation of the second clutch C2, and the fifth shaft TM5 is connected to the ninth shaft TM9 by operation of the fifth clutch C5, the torque of the input shaft IS is input to the first shaft TM1.

In addition, the fourth shaft TM4 is continuously operated as the fixed element. Therefore, the torque of the input shaft IS is shifted into the seventh forward speed, and the seventh forward speed is output through the output shaft OS connected to the seventh shaft TM7.

The second, the fourth, and the fifth clutches C2, C4, and C5 are simultaneously operated at an eighth forward speed D8.

In a state that the second shaft TM2 is connected to the sixth shaft TM6 by operation of the second clutch C2, the third shaft TM3 is connected to the eighth shaft TM8 by operation of the fourth clutch C4, and the fifth shaft TM5 is connected to the ninth shaft TM9 by operation of the fifth clutch C5, the torque of the input shaft IS is input to the first shaft TM1.

In addition, the fourth shaft TM4 is continuously operated as the fixed element. Therefore, the torque of the input shaft IS is shifted into the eighth forward speed, and the eighth forward speed is output through the output shaft OS connected to the seventh shaft TM7.

The second, the third, and the fifth clutches C2, C3, and C5 are simultaneously operated at a ninth forward speed D9.

In a state that the second shaft TM2 is connected to the sixth shaft TM6 by operation of the second clutch C2, the second shaft TM2 is connected to the ninth shaft TM9 by operation of the third clutch C3, and the fifth shaft TM5 is connected to the ninth shaft TM9 by operation of the fifth clutch C5, the torque of the input shaft IS is input to the first shaft TM1.

In addition, the fourth shaft TM4 is continuously operated as the fixed element. Therefore, the torque of the input shaft IS is shifted into the ninth forward speed, and the ninth forward speed is output through the output shaft OS connected to the seventh shaft TM7.

The third, the fourth, and the fifth clutches C3, C4, and C5 are simultaneously operated at a tenth forward speed D10.

In a state that the second shaft TM2 is connected to the ninth shaft TM9 by operation of the third clutch C3, the third shaft TM3 is connected to the eighth shaft TM8 by operation of the fourth clutch C4, and the fifth shaft TM5 is connected to the ninth shaft TM9 by operation of the fifth clutch C5, the torque of the input shaft IS is input to the first shaft TM1.

In addition, the fourth shaft TM4 is continuously operated as the fixed element. Therefore, the torque of the input shaft IS is shifted into the tenth forward speed, and the tenth forward speed is output through the output shaft OS connected to the seventh shaft TM7.

The second and the fourth clutches C2 and C4 and the first brake B1 are simultaneously operated at a reverse speed REV.

In a state that the second shaft TM2 is connected to the sixth shaft TM6 by operation of the second clutch C2 and the third shaft TM3 is connected to the eighth shaft TM8 by operation of the fourth clutch C4, the torque of an input shaft IS is input to the first shaft TM1.

In a state that the fourth shaft TM4 is continuously operated as the fixed element, the sixth shaft TM6 is operated as the fixed element by operation of the first brake B1. Therefore, the torque of the input shaft IS is shifted into the reverse speed, and the reverse speed is output through the output shaft OS connected to the seventh shaft TM7 as inverse rotation speed.

The planetary gear trains according to the exemplary embodiment of the present invention may achieve at least ten forward speeds and one reverse speed by combining four planetary gear sets PG1, PG2, PG3, and PG4 with the five clutches C1, C2, C3, C4, and C5 and the one brake B1.

In addition, the planetary gear train according to the exemplary embodiment of the present invention may achieve suitable speed stages according to rotation speed of the engine. Particularly, silent driving of the vehicle may be improved by using operation point positioned at a low rotational speed region of the engine.

In addition, the planetary gear train according to the exemplary embodiment of the present invention may maximize driving efficiency of the engine and may improve power delivery performance and fuel consumption.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle comprising:
    an input shaft receiving torque of an engine;
    an output shaft outputting torque;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    a fourth planetary gear set including a tenth rotation element, an eleventh rotation element, and a twelfth rotation element;
    a first shaft fixedly connected to the first rotation element and the fifth rotation element and fixedly connected to the input shaft;
    a second shaft fixedly connected to the second rotation element;
    a third shaft fixedly connected to the third rotation element and selectively connectable to the second shaft;
    a fourth shaft fixedly connected to the fourth rotation element and fixedly connected to a transmission housing;
    a fifth shaft fixedly connected to the sixth rotation element;
    a sixth shaft fixedly connected to the seventh rotation element and the twelfth rotation element and selectively connectable to the second shaft;
    a seventh shaft fixedly connected to the eighth rotation element and the eleventh rotation element and fixedly connected to the output shaft;
    an eighth shaft fixedly connected to the ninth rotation element and selectively connectable to the third shaft; and
    a ninth shaft fixedly connected to the tenth rotation element and selectively connectable to the second shaft or the fifth shaft.

2. The planetary gear train of claim 1, wherein the sixth shaft is selectively connectable to the transmission housing.

3. The planetary gear train of claim 1, wherein the first rotation element, the second rotation element, and the third rotation element of the first planetary gear set are a first sun gear, a first planet carrier, and a first ring gear, respectively,
    the fourth rotation element, the fifth rotation element, and the sixth rotation element of the second planetary gear set are a second sun gear, a second planet carrier, and a second ring gear, respectively,
    the seventh rotation element, the eighth rotation element, and the ninth rotation element of the third planetary gear set are a third sun gear, a third planet carrier, and a third ring gear, respectively, and
    the tenth rotation element, the eleventh rotation element, and the twelfth rotation element of the fourth planetary gear set are a fourth sun gear, a fourth planet carrier, and a fourth ring gear, respectively.

4. The planetary gear train of claim 1, wherein the first, the second, the third, and the fourth planetary gear sets are positioned in a sequence of the third, the first, the second, and the fourth planetary gear sets from the engine.

5. The planetary gear train of claim 2, further comprising:
- a first clutch selectively connecting the second shaft to the third shaft;
- a second clutch selectively connecting the second shaft to the sixth shaft;
- a third clutch selectively connecting the second shaft to the ninth shaft;
- a fourth clutch selectively connecting the third shaft to the eighth shaft;
- a fifth clutch selectively connecting the fifth shaft to the ninth shaft; and
- a first brake selectively connecting the sixth shaft to the transmission housing.

6. A planetary gear train of an automatic transmission for a vehicle comprising:
- an input shaft receiving torque of an engine;
- an output shaft outputting torque;
- a first planetary gear set including a first rotation element, a second rotation element, and a third rotation element;
- a second planetary gear set including a fourth rotation element, a fifth rotation element, and a sixth rotation element;
- a third planetary gear set including a seventh rotation element, an eighth rotation element, and a ninth rotation element; and
- a fourth planetary gear set including a tenth rotation element, an eleventh rotation element, and a twelfth rotation element,
- wherein the input shaft is connected to the fifth rotation element,
- the output shaft is connected to the eleventh rotation element,
- the first rotation element is connected to the fifth rotation element,
- the seventh rotation element is connected to the twelfth rotation element,
- the eighth rotation element is connected to the eleventh rotation element,
- the second rotation element is selectively connectable to the third, the seventh, and the tenth rotation elements,
- the third rotation element is selectively connectable to the ninth rotation element, and
- the sixth rotation element is selectively connectable to the tenth rotation element.

7. The planetary gear train of claim 6, wherein the seventh rotation element is selectively connectable to a transmission housing.

8. The planetary gear train of claim 6, wherein the first rotation element, the second rotation element, and the third rotation element of the first planetary gear set are a first sun gear, a first planet carrier, and a first ring gear, respectively,
- the fourth rotation element, the fifth rotation element, and the sixth rotation element of the second planetary gear set are a second sun gear, a second planet carrier, and a second ring gear, respectively,
- the seventh rotation element, the eighth rotation element, and the ninth rotation element of the third planetary gear set are a third sun gear, a third planet carrier, and a third ring gear, respectively, and
- the tenth rotation element, the eleventh rotation element, and the twelfth rotation element of the fourth planetary gear set are a fourth sun gear, a fourth planet carrier, and a fourth ring gear, respectively.

9. The planetary gear train of claim 6, wherein the first, the second, the third, and the fourth planetary gear sets are positioned in a sequence of the third, the first, the second, and the fourth planetary gear sets from the engine.

10. The planetary gear train of claim 7, further comprising:
- a first clutch selectively connecting the second rotation element to the third rotation element;
- a second clutch selectively connecting the second rotation element to the seventh rotation element;
- a third clutch selectively connecting the second rotation element to the tenth rotation element;
- a fourth clutch selectively connecting the third rotation element to the ninth rotation element;
- a fifth clutch selectively connecting the sixth rotation element to the tenth rotation element; and
- a first brake selectively connecting the seventh rotation element to a transmission housing.

* * * * *